US011922109B2

(12) United States Patent
Venton et al.

(10) Patent No.: US 11,922,109 B2
(45) Date of Patent: Mar. 5, 2024

(54) PREDICTIVE ANTENNA DIODE INSERTION

(71) Applicant: International Business Machines Corporation, Armonk, NY (US)

(72) Inventors: Amanda Christine Venton, Austin, TX (US); Michael Alexander Bowen, Poughkeepsie, NY (US); Rahul M. Rao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 17/400,176

(22) Filed: Aug. 12, 2021

(65) Prior Publication Data
US 2023/0048876 A1    Feb. 16, 2023

(51) Int. Cl.
| | | |
|---|---|---|
| G06F 30/394 | (2020.01) | |
| G06F 30/398 | (2020.01) | |
| G06F 111/04 | (2020.01) | |
| G06F 113/18 | (2020.01) | |
| G06F 115/12 | (2020.01) | |
| H01Q 1/34 | (2006.01) | |

(52) U.S. Cl.
CPC ......... *G06F 30/394* (2020.01); *G06F 30/398* (2020.01); *G06F 2111/04* (2020.01); *G06F 2113/18* (2020.01); *G06F 2115/12* (2020.01); *H01Q 1/34* (2013.01)

(58) Field of Classification Search
CPC .. G06F 30/394; G06F 30/398; G06F 2111/04; G06F 2113/18; G06F 2115/12; G06F 30/31; G06F 30/39; G06F 30/392; G06F 30/396; H01Q 1/2225; H01Q 1/34; H01L 2224/73265; H01L 2924/20751; H01L 2924/20752; H01L 2924/15311; H03L 7/0995
USPC .................................................. 716/127–131
See application file for complete search history.

(56) References Cited

U.S. PATENT DOCUMENTS

| | | |
|---|---|---|
| 6,578,175 B1 | 6/2003 | Benevit et al. |
| 7,073,148 B1 | 7/2006 | Jenkins |
| 7,302,663 B1 | 11/2007 | Gan et al. |
| 7,721,244 B2 | 5/2010 | Ono |
| 7,915,907 B2 | 3/2011 | Ong et al. |
| 8,028,264 B2 | 9/2011 | Shimada et al. |
| 8,341,560 B2 | 12/2012 | Kobayashi |
| 10,749,490 B1 * | 8/2020 | Piernas ............... H04B 1/18 |

(Continued)

FOREIGN PATENT DOCUMENTS

| | | |
|---|---|---|
| CN | 107122567 A | 9/2017 |
| WO | 2016060544 A1 | 4/2016 |

*Primary Examiner* — Binh C Tat
(74) *Attorney, Agent, or Firm* — CANTOR COLBURN LLP; Kelsey Skodje

(57) ABSTRACT

Embodiments include predictive antenna diode insertion. Aspects of the invention include obtaining a design of a macro, the design including an internal pin disposed on a first layer of the macro. Aspects of the invention also include determining a length of a wire needed to connect the internal pin to a furthest edge of the macro for each of two layers above the layer the internal pin. Aspects of the invention further include adding, to the design of the macro, an antenna diode to the internal pin based on the determination that an area of the wire needed exceeds a threshold value, wherein the area of the wire is based on the length and a width of the wire.

20 Claims, 5 Drawing Sheets

(56) References Cited

U.S. PATENT DOCUMENTS

2014/0159157 A1*  6/2014  Jensen ................ H01L 27/0207
                                                  438/294
2018/0074140 A1*  3/2018  Yang .................... G01R 33/307

* cited by examiner

PREDICTIVE ANTENNA DIODE INSERTION

BACKGROUND

The present invention generally relates to integrated circuit development, and more specifically, to integrated circuit development using predictive antenna diode insertion.

The development of an integrated circuit (i.e., chip) involves several stages from design through fabrication. The chip may be subdivided into hierarchical levels to simplify design and testing tasks at different stages. Generally, a cell or macro may be regarded as a sub-section of the chip. For example, each macro may comprise a number of cells. Once the design is finalized, tests may be completed to ensure that design rules established by a foundry are met prior to fabrication. Design rules may be applied to sections of the chip. For example, a grid may be overlaid on the chip and each section of the grid (i.e., tile) may be checked for complicity with design rules.

During the design of macros, antenna diodes are often manually added to the layout of the macro to provide a contact from a metal layer to a diffusion layer of a device for manufacturing purposes. This contact provides a path for charge generated in long metal lines or large via areas during manufacturing to be dissipated without damaging a transistor gate or other circuit implemented on a semiconductor substrate. No prior art techniques currently available provide a method for predictively placing antenna diodes using computer software tools to create the layout of the macro.

SUMMARY

Embodiments of the present invention are directed to integrated circuit development using predictive antenna diode insertion. A non-limiting example computer-implemented method includes obtaining a design of a macro, the design including an internal pin disposed on a first layer of the macro. The method also includes determining a length of a wire needed to connect the internal pin to a furthest edge of the macro for each of two layers above the layer the internal pin. The method further includes include adding, to the design of the macro, an antenna diode to the internal pin based on the determination that an area of the wire needed exceeds a threshold value, wherein the area of the wire is based on the length and a width of the wire.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

As previously noted, integrated circuit development may involve several stages from design through fabrication. As also noted, at one or more stages, the integrated circuit design may be subdivided hierarchically for design or testing tasks. One commonly manually performed design task is the insertion of antenna diodes to fix antenna violations on internal pins. A drawback of manually performing this task is that the routing topology may be unknown and, even if known, it is subject to change over time. Accordingly, embodiments include a method for predictive antenna diode insertion that is performed based on the location of the internal pins of a macro and the dimensions of the macro, which does not require knowledge of the routing topology. The predictive antenna diode insertion method assesses the need for an antenna diode by making some reasonable engineering assumptions regarding the routing topology that will be used in the macro. In one embodiment, an antenna violation is predicted for an internal pin, and an antenna diode insertion is performed, based on a determination that the area of a wire needed to connect the internal pin to the farthest edge of a macro from the internal pin, where the area is determined based on the length and width of the wire. In exemplary embodiments, the predictive antenna diode insertion is able to perform parallel cleanup of antenna violations across the hierarchy of the macro.

Figure 1:
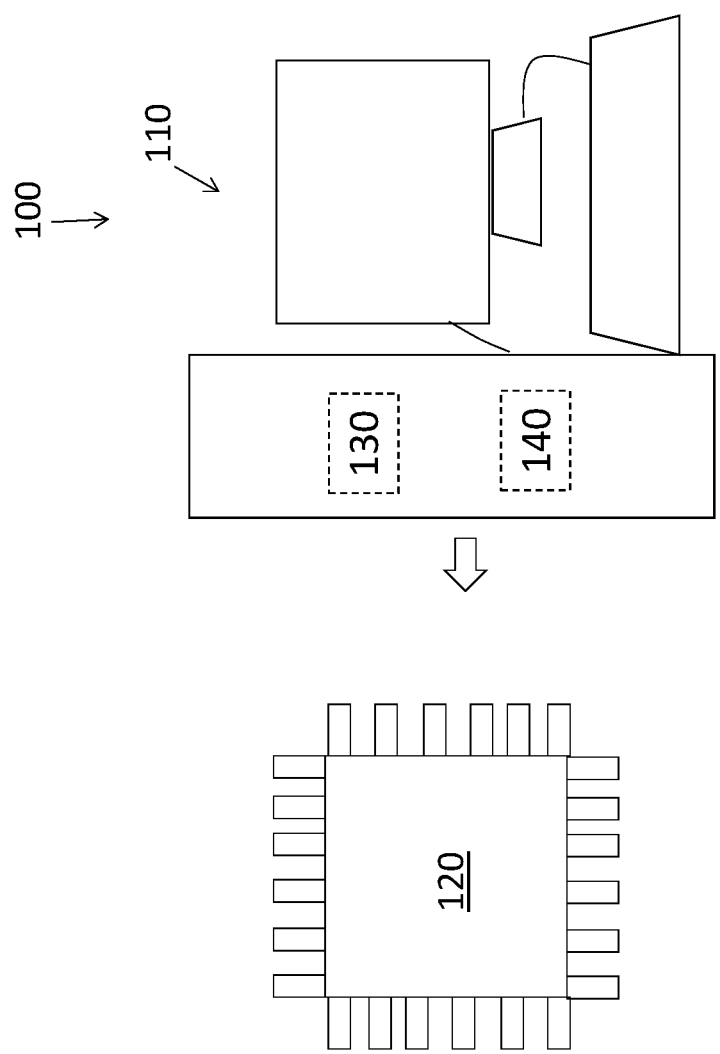
FIG. 1 is a block diagram of a system to perform the development of an integrated circuit using predictive antenna diode insertion according to one or more embodiments of the invention.

FIG. 1 is a block diagram of a system 100 to perform predictive antenna diode insertion according to embodiments of the invention. The system 100 includes processing circuitry 110 used to generate the design that is ultimately fabricated into an integrated circuit 120. The steps involved in the fabrication of the integrated circuit 120 are well-known and briefly described herein. Once the physical layout is finalized, based, in part, on predictive antenna diode insertion according to embodiments of the invention to facilitate optimization of the routing plan, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 5.

Figure 2:
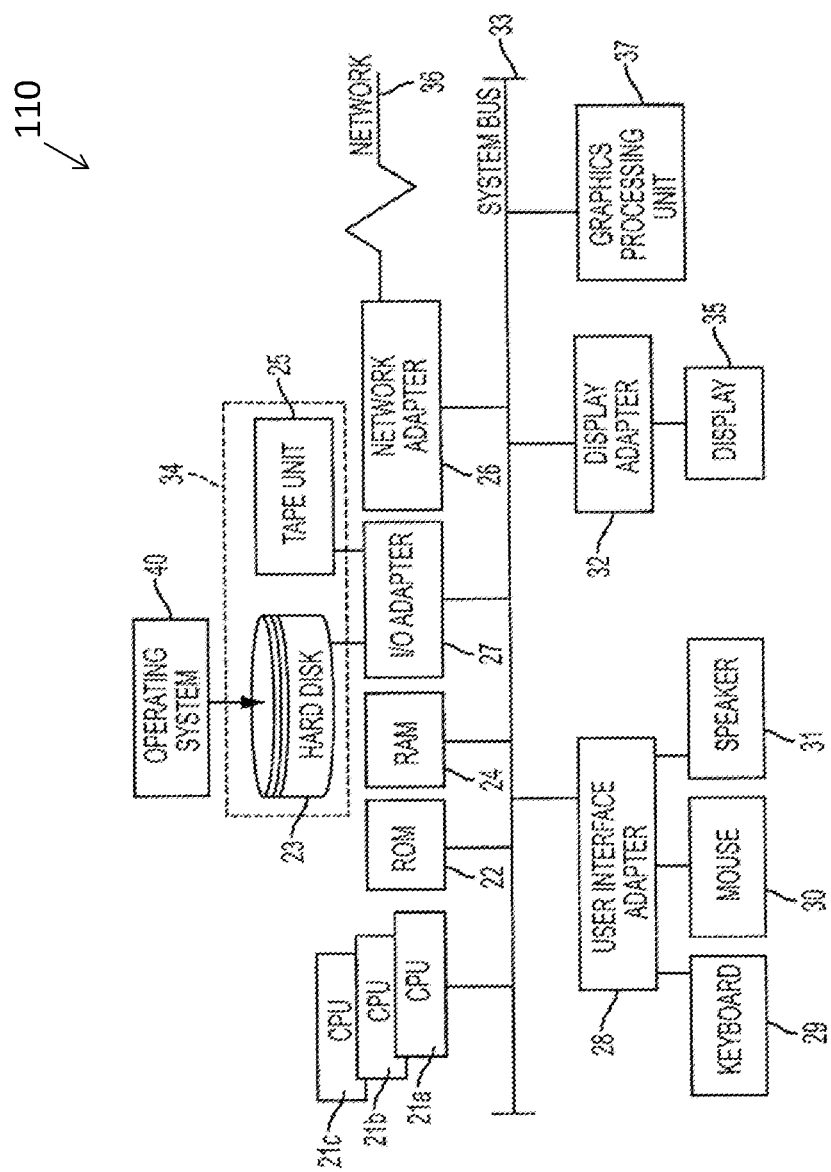
FIG. 2 is a block diagram of a processing system to generate the design that is fabricated into the integrated circuit according to one or more embodiments of the invention.

FIG. 2 is a block diagram of a processing system 110 used to generate the design that is fabricated into the integrated circuit 120. The processing system 110 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 110.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 110 can be stored in mass storage 34. The RAM 22, ROM 24, and mass storage 34 are examples of memory 19 of the processing system 110. A network adapter 26 interconnects system bus 33 with an outside network 36 enabling the processing system 110 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 110 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 110 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in the processing system 110.

Figure 3B:
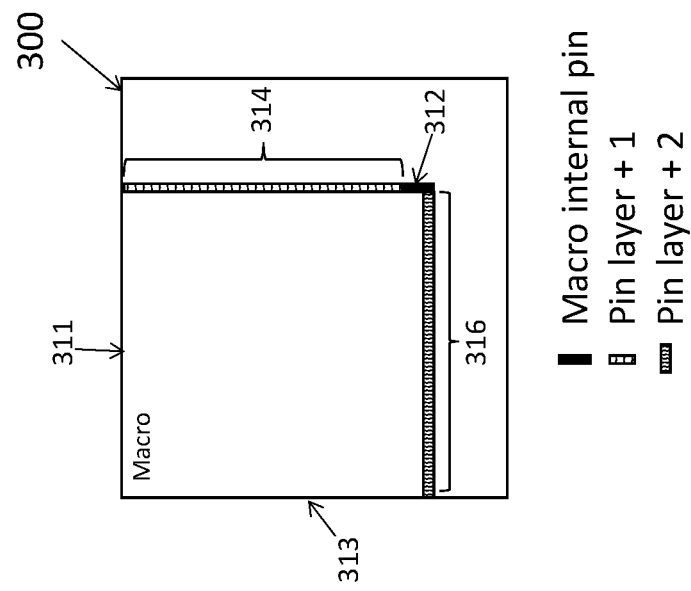
FIG. 3B illustrates a schematic diagram of another internal pin of the macro being evaluated for predictive antenna diode insertion according to one or more embodiments of the invention.
Figure 3A:
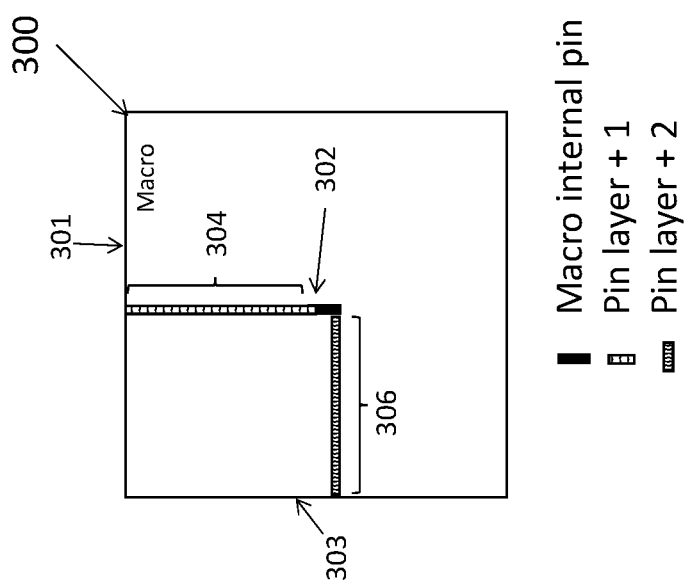
FIG. 3A illustrates a schematic diagram of an internal pin of a macro being evaluated for predictive antenna diode insertion according to one or more embodiments of the invention.

Referring now to FIGS. 3A and 3B, schematics diagrams of internal pins of a macro 300 being evaluated for predictive antenna diode insertion according to one or more embodiments of the invention are shown. As shown in FIG. 3A, an internal pin 302 of the macro is evaluated for predictive antenna diode insertion. The process of evaluating the internal pin 302 for predictive antenna diode insertion begins by identifying a furthest edge 301 of the macro from the internal pin 302 for a first layer above the layer on which the pin is located. Next, a furthest edge 303 of the macro from the internal pin 302 for a second layer above the layer on which the pin is located. Then, a length of a wire 304 needed to reach the edge 301 and a wire 306 needed to reach edge 303 are determined. Once the lengths of the wires 304, 306 are determined, an area of each wire 304, 306 is determined based on the minimum wire widths for the layers of the macro. In one embodiment, the area is determined to be the lengths of the wires 304, 306 times the minimum wire width. In another embodiment, the area is determined to be the lengths of the wires 304, 306 times one and a half of the minimum wire width.

Similarly, as shown in FIG. 3B, another internal pin 312 of the macro is evaluated for predictive antenna diode insertion. The process of evaluating the internal pin 312 for predictive antenna diode insertion begins by identifying a furthest edge 311 of the macro from the internal pin 312 for a first layer above the layer on which the pin 312 is located. Next, a furthest edge 313 of the macro from the internal pin 312 for a second layer above the layer on which the pin 312 is located. Then, a length of a wire 314 needed to reach the edge 311 and a wire 316 needed to reach edge 313 are determined. Once the lengths of the wires 314, 316 are determined, an area of each wire 314, 316 is determined based on the minimum wire widths for the layers of the macro.

Once the area of each wire 314, 316 are determined, the area of the wires 314, 316 are compared to a maximum wire area that is specified by the design of the macro. If the area of either of the wires 314, 316 exceeds the maximum wire area, the area of the wires 314, 316 is set to be the maximum wire area. Next, a gate and diffusion area connected to the internal pins 302, 312 are obtained from the design of the macro, and a threshold wire area for wires 314, 316 is determined based on the gate and the diffusion area, also referred to herein as an rx area. In exemplary embodiments, the thresholds and constants used to predict an antenna fail is dependent on the fabrication method, or technology, used to fabricate the IC. In general, an antenna failure prediction is based on a determination that the area of layer being checked divided by the circuit area is above a threshold ratio.

Based on a determination that the area of one of the wires 314, 316 exceeds the calculated threshold wire area, an antenna diode is added to the design of the macro for the corresponding internal pin 302, 312. In exemplary embodiments, as the gate and rx area connected to the internal pins 302, 312 increase so does the permissible wire area, and hence permissible length or permissible width of the wires 314, 316 before an antenna diode needs to be added to the internal pin.

In one embodiment, a threshold wire area (T) is compared to a wire area (A) that is calculated as $Min(L_m, Max(L_1, L_2,$ $L_3, L_4))*1.5*w$, where $L_m$ is a maximum wire length for the macro, $L_1$ is a length of a shortest wire from a pin to a first edge of the macro, $L_2$ is a length of a shortest wire from a pin to a second edge of the macro, $L_3$ is a length of a shortest wire from a pin to a third edge of the macro, $L_4$ is a length of a shortest wire from a pin to a fourth edge of the macro, and w is a minimum width of a wire for the macro.

Figure 4:
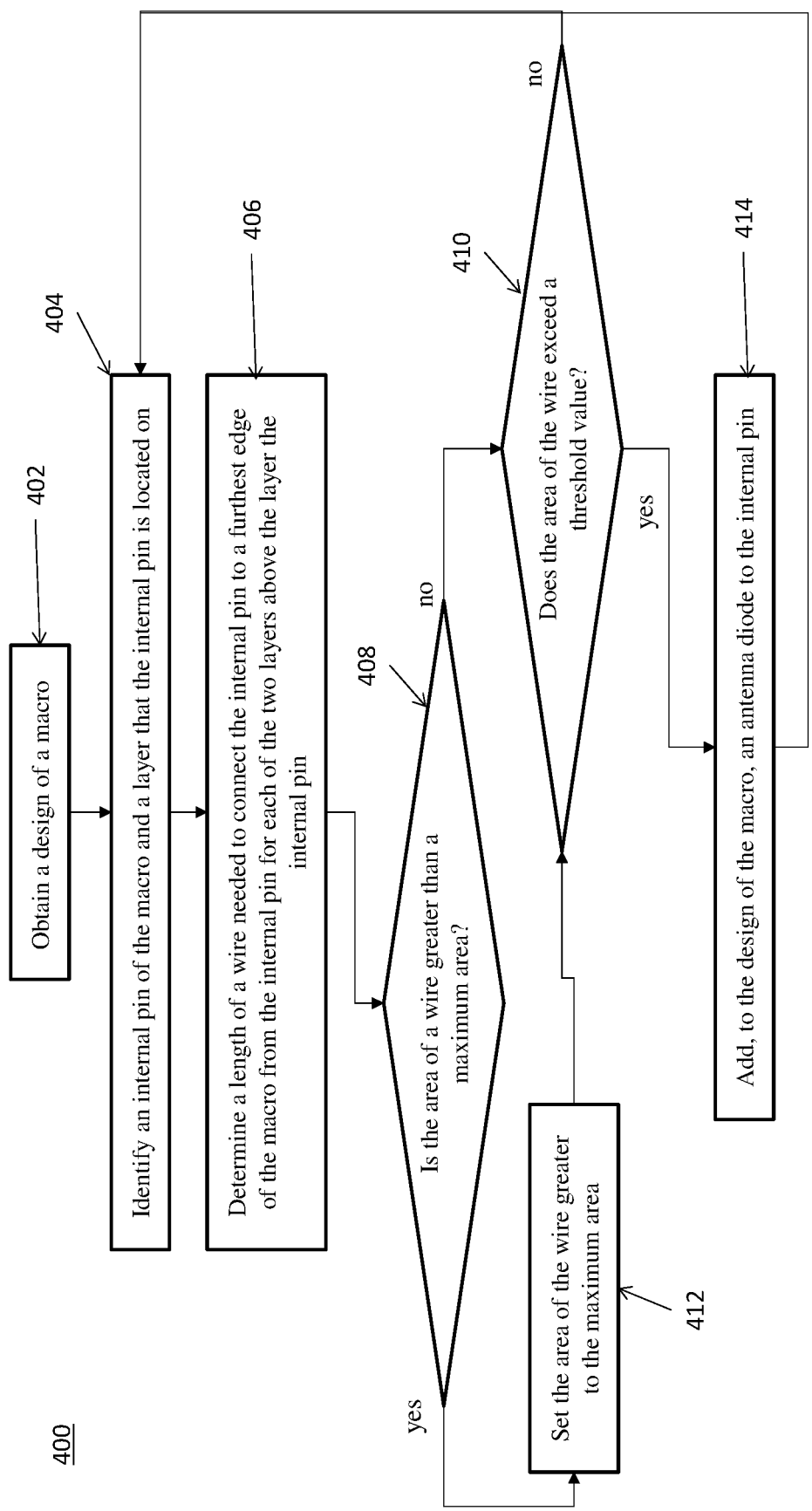
FIG. 4 is a process flow of a method of predictive antenna diode insertion in the development of an integrated circuit according to one or more embodiments of the invention.

FIG. 4 is a process flow of a method 400 of predictive antenna diode insertion according to exemplary embodiments of the invention. The method 400 begins at block 402 by obtaining a design of a macro. Next, as shown at block 404 the method 400 includes identifying an internal pin of the macro and a layer that the internal pin is located on. The method 400 also includes determining an area of a wire needed to connect the internal pin to the furthest edge of the macro for each of the two layers above the layer the internal pin is located on, as shown at block 406. Next, as shown at decision block 408, the method 400 includes determining if the area of the wire needed is greater than a maximum area. If the area of the wire needed is greater than a maximum area, the method 400 proceeds to block 412 and sets the area of the wire needed to the maximum area. Otherwise, the method 400 proceeds to decision block 410 and determines if the area of the wire exceeds a threshold value. Based on a determination that the area of the wire exceeds the threshold value, the method 400 proceeds to block 414 and adds, to the design of the macro, an antenna diode to the internal pin. The method 400 repeats this process for each internal pin of the macro until each internal pin has been evaluated for adding an antenna diode.

In exemplary embodiments, the threshold value for each internal pin is determined based on the characteristics of the internal pin, which is obtained from the design of the macro. In one embodiment, the characteristics of the internal pin include a gate and rx area of the internal pin. In exemplary embodiments, as the gate and rx area of the internal pin increases, the threshold value increases. As a result, internal pins with a larger gate area will have a longer permissible length of the wire needed before an antenna diode needs to be added to the internal pin.

In exemplary embodiments, by ensuring that the area of the wire needed does not exceed a maximum area, the predictive antenna diode insertion method reduces the chances that an unneeded antenna diode is added to an internal pin, especially in the case of large macros. In one embodiment, the maximum area is specified by the design of the macro. In one embodiment the maximum area is specified as a fixed area and in another embodiment, the maximum area is set as a percentage of the largest dimension of the macro. For example, the maximum area can be set to be sixty percent of the longer of the length or width of the macro, multiplied by one and a half times the minimum wire width of the layer above the interior pin.

Figure 5:
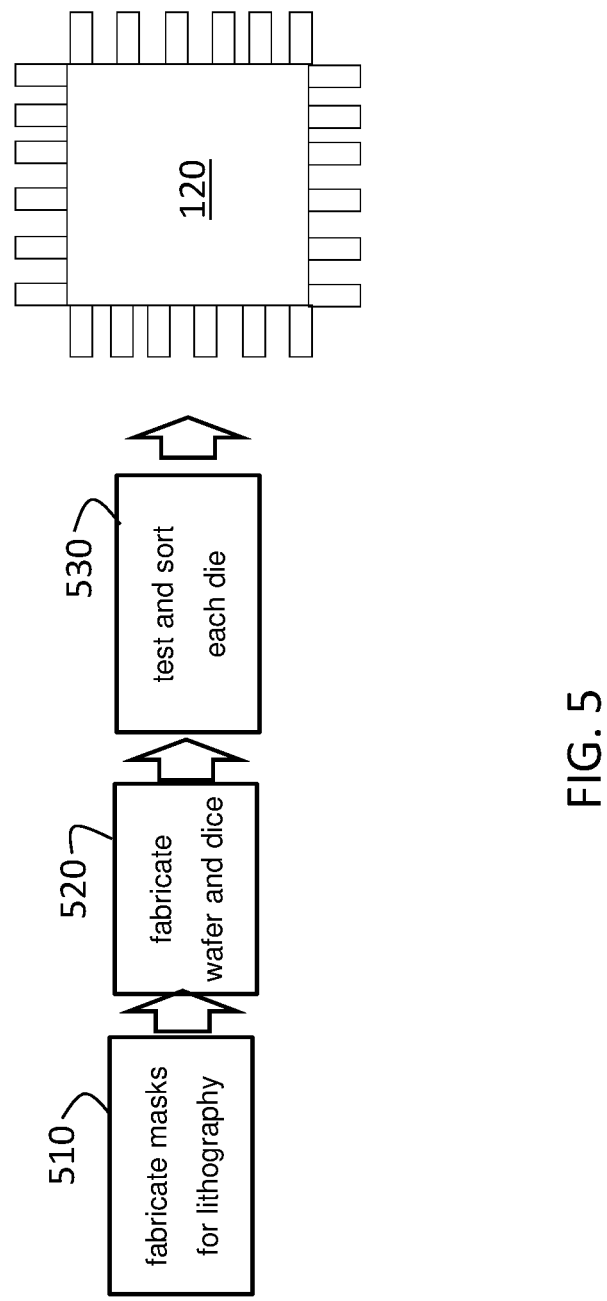
FIG. 5 is a process flow of a method of fabricating the integrated circuit according to exemplary embodiments of the invention.

FIG. 5 is a process flow of a method 500 of fabricating the integrated circuit according to exemplary embodiments of the invention. Once the physical design data is obtained, based, in part, on the processes discussed with reference to FIG. 4, the integrated circuit 120 can be fabricated according to known processes that are generally described with reference to FIG. 5. Generally, a wafer with multiple copies of the final design is fabricated and cut (i.e., diced) such that each die is one copy of the integrated circuit 120. At block 510, the processes include fabricating masks for lithography based on the finalized physical layout. At block 520, fabricating the wafer includes using the masks to perform photolithography and etching. Once the wafer is diced, testing and sorting each die is performed, at block 530, to filter out any faulty die.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for predictive antenna diode insertion, the method comprising:
    obtaining a design of a macro, the design including an internal pin disposed on a first layer of the macro;
    determining a length of a wire needed to connect the internal pin to a furthest edge of the macro for each of two layers above the layer the internal pin; and
    adding, to the design of the macro, an antenna diode to the internal pin based on the determination that an area of the wire needed exceeds a threshold value, wherein the area of the wire is based on the length and a width of the wire.

2. The method of claim 1, further comprising:
    obtaining a gate area of the internal pin,
    wherein the threshold value is determined based at least in part on the gate area of the internal pin.

3. The method of claim 2, wherein gate area of the internal pin is specified in the design of the macro.

4. The method of claim 1, further comprising:
    obtaining a maximum wire length; and
    based on a determination that the length of the wire needed is greater than the maximum wire length, setting the length of the wire needed to the maximum wire length.

5. The method of claim 4, wherein the maximum wire length is specified in the design of the macro.

6. The method of claim 1, wherein the design includes a plurality of internal pins disposed on various layers of the macro, iteratively:
    determining a length of wire needed to connect each of the plurality of internal pins to a furthest edge of the macro two layers above the internal pin; and
    adding, to the design of the macro, antenna diodes to each of the plurality of internal pins based on the determination that an area of the wire needed exceeds a threshold value, wherein the area of the wire is based on the length and a width of the wire.

7. The method of claim 6, further comprising:
    obtaining a gate area and a diffusion area of each of the plurality of internal pins,
    wherein the threshold value is determined based at least in part on the gate and the diffusion area of each of the plurality of internal pins.

8. A system comprising:
    a memory having computer readable instructions; and
    one or more processors for executing the computer readable instructions, the computer readable instructions controlling the one or more processors to perform operations comprising:
        obtaining a design of a macro, the design including an internal pin disposed on a first layer of the macro;
        determining a length of a wire needed to connect the internal pin to a furthest edge of the macro for each of two layers above the layer the internal pin; and
        adding, to the design of the macro, an antenna diode to the internal pin based on the determination that an area of the wire needed exceeds a threshold value, wherein the area of the wire is based on the length and a width of the wire.

9. The system of claim 8, wherein the operations further comprise:
    obtaining a gate area of the internal pin,
    wherein the threshold value is determined based at least in part on the gate area of the internal pin.

10. The system of claim 9, wherein gate area of the internal pin is specified in the design of the macro.

11. The system of claim 8, wherein the operations further comprise:
    obtaining a maximum wire length; and
    based on a determination that the length of the wire needed is greater than the maximum wire length, setting the length of the wire needed to the maximum wire length.

12. The system of claim 11, wherein the maximum wire length is specified in the design of the macro.

13. The system of claim 12, wherein the design includes a plurality of internal pins disposed on various layers of the macro, iteratively:
    determining a length of wire needed to connect each of the plurality of internal pins to a furthest edge of the macro two layers above the internal pin; and
    adding, to the design of the macro, antenna diodes to each of the plurality of internal pins based on the determination that an area of the wire needed exceeds a threshold value, wherein the area of the wire is based on the length and a width of the wire.

14. The system of claim 13, wherein the operations further comprise:
obtaining a gate area and a diffusion area of each of the plurality of internal pins,
wherein the threshold value is determined based at least in part on the gate and the diffusion area of each of the plurality of internal pins.

15. A computer program product comprising a computer readable storage medium having program instructions embodied therewith, the program instructions executable by a processor to cause the processor to perform operations comprising:
obtaining a design of a macro, the design including an internal pin disposed on a first layer of the macro;
determining a length of a wire needed to connect the internal pin to a furthest edge of the macro for each of two layers above the layer the internal pin; and
adding, to the design of the macro, an antenna diode to the internal pin based on the determination that an area of the wire needed exceeds a threshold value, wherein the area of the wire is based on the length and a width of the wire.

16. The computer program product of claim 15, wherein the operations further comprise:
obtaining a gate area of the internal pin,
wherein the threshold value is determined based at least in part on the gate area of the internal pin.

17. The computer program product of claim 16, wherein gate area of the internal pin is specified in the design of the macro.

18. The computer program product of claim 15, wherein the operations further comprise:
obtaining a maximum wire length; and
based on a determination that the length of the wire needed is greater than the maximum wire length, setting the length of the wire needed to the maximum wire length.

19. The computer program product of claim 18, wherein the maximum wire length is specified in the design of the macro.

20. The computer program product of claim 15, wherein the design includes a plurality of internal pins disposed on various layers of the macro, iteratively:
determining a length of wire needed to connect each of the plurality of internal pins to a furthest edge of the macro two layers above the internal pin; and
adding, to the design of the macro, antenna diodes to each of the plurality of internal pins based on the determination that an area of the wire needed exceeds a threshold value, wherein the area of the wire is based on the length and a width of the wire.

\* \* \* \* \*